US006647411B2

(12) United States Patent
Towell et al.

(10) Patent No.: US 6,647,411 B2
(45) Date of Patent: *Nov. 11, 2003

(54) SECURE CACHED SUBSCRIPTION SERVICE

(75) Inventors: Timothy N. Towell, Sherwood, OR (US); Gregory Kisor, Portland, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/430,518

(22) Filed: Oct. 29, 1999

(65) Prior Publication Data

US 2003/0050991 A1 Mar. 13, 2003

(51) Int. Cl.$^7$ .............................................. G06F 15/167
(52) U.S. Cl. ................. 709/213; 709/203; 709/219; 709/229; 705/52; 725/2; 725/46; 725/142
(58) Field of Search ................................. 709/213, 203, 709/208, 216–219, 225, 229; 705/52; 725/1, 2, 4, 14, 25, 39, 40, 46, 47, 115, 119, 120, 132, 134, 139, 140, 142

(56) References Cited

U.S. PATENT DOCUMENTS

| | | | |
|---|---|---|---|
| 4,430,669 A | 2/1984 | Cheung | 358/122 |
| 4,734,764 A | 3/1988 | Pocock et al. | 358/86 |
| 4,860,123 A | 8/1989 | McCalley et al. | 358/342 |
| 5,319,455 A | 6/1994 | Hoarty et al. | 348/7 |
| 5,410,343 A | 4/1995 | Coddington et al. | 348/7 |
| 5,485,197 A | 1/1996 | Hoarty | 348/7 |
| 5,539,449 A | 7/1996 | Blahut et al. | 348/7 |
| 5,539,822 A | 7/1996 | Lett | 380/20 |
| 5,572,442 A | 11/1996 | Schulhof et al. | 364/514 C |
| 5,585,865 A | 12/1996 | Amano et al. | |
| 5,603,058 A | 2/1997 | Belknap et al. | 395/855 |
| 5,644,714 A | 7/1997 | Kikinis | 395/200.03 |
| 5,649,186 A | 7/1997 | Ferguson | 395/610 |
| 5,657,072 A * | 8/1997 | Aristides et al. | 725/46 |
| 5,708,960 A | 1/1998 | Kamisaka et al. | 455/3.2 |
| 5,710,884 A * | 1/1998 | Dedrick | 709/217 |
| 5,721,827 A | 2/1998 | Logan et al. | 709/217 |
| 5,737,337 A | 4/1998 | Voith et al. | 371/2.2 |
| 5,740,549 A | 4/1998 | Reilly et al. | 705/14 |
| 5,761,662 A | 6/1998 | Dasan | 707/10 |
| 5,768,517 A | 6/1998 | Kassatly | 395/200.47 |

(List continued on next page.)

OTHER PUBLICATIONS

Whittier, Ron, "Push/Pull: PC Technology/End User Demand", IEEE Journal, 1996 Symposium on VLSI Technology Digest of Technical Papers, pp. 2–5.*

Richardson, David. "Data Broadcasting—The Ultimate Technology?", International Broadcasting Convention, Sep. 12–16, 1997, No. 447, IEEE, pp. 36–42.*

Kinoshita, Shingo, et al. "The Realpush Network: A New Push–Type Content Delivery System Using Reliable Multicasting", IEEE Transactions on Consumer Electronics, vol. 44, No. 4, Nov. 1998, pp. 1216–1224.*

Primary Examiner—Robert B. Harrell
Assistant Examiner—M H P
(74) Attorney, Agent, or Firm—Blakely, Sokoloff, Taylor & Zafman LLP

(57) ABSTRACT

A system and method for a secure cached subscription system is described. In one embodiment, the system comprises a content provider and a caching device connected to the content provider. The content provider speculatively downloads information into the caching device based upon a user's data. A processing device is connected via a high-bandwidth connection to the caching device for processing the information.

29 Claims, 10 Drawing Sheets

U.S. PATENT DOCUMENTS

| | | | |
|---|---|---|---|
| 5,815,671 A | 9/1998 | Morrison | 395/200.77 |
| 5,819,160 A | 10/1998 | Foladare et al. | 455/45 |
| 5,848,398 A | 12/1998 | Martin et al. | 705/14 |
| 5,884,284 A * | 3/1999 | Peters et al. | 705/30 |
| 5,901,339 A * | 5/1999 | Saito | 725/5 |
| 5,990,881 A * | 11/1999 | Inoue et al. | 345/720 |
| 6,078,348 A * | 6/2000 | Klosterman et al. | 725/40 |
| 6,085,226 A * | 7/2000 | Horvitz | 709/203 |
| 6,154,767 A * | 11/2000 | Altschuler et al. | 709/203 |
| 6,195,692 B1 * | 2/2001 | Hsu | 709/219 |
| 6,237,022 B1 * | 5/2001 | Bruck et al. | 709/201 |
| 6,260,192 B1 * | 7/2001 | Rosin et al. | 725/39 |
| 6,269,394 B1 * | 7/2001 | Kenner et al. | 709/217 |
| 6,298,373 B1 * | 10/2001 | Burns et al. | 709/203 |
| 6,317,789 B1 * | 11/2001 | Rakavy et al. | 709/224 |
| 6,321,221 B1 * | 11/2001 | Bieganski | 707/5 |
| 6,324,182 B1 * | 11/2001 | Burns et al. | 370/429 |
| 6,362,836 B1 * | 3/2002 | Shaw et al. | 345/744 |
| 6,385,693 B1 * | 5/2002 | Gerszberg et al. | 711/118 |
| 6,397,387 B1 * | 5/2002 | Rosin et al. | 725/44 |
| 6,400,996 B1 * | 6/2002 | Hoffberg et al. | 700/83 |
| 6,426,779 B1 * | 7/2002 | Noguchi et al. | 348/569 |
| 6,463,585 B1 * | 10/2002 | Hendricks et al. | 725/35 |
| 6,477,508 B1 * | 11/2002 | Lazar et al. | 705/26 |
| 6,493,680 B2 * | 12/2002 | Logan et al. | 705/34 |
| 6,501,514 B1 * | 12/2002 | Townsend et al. | 348/734 |
| 6,542,882 B1 * | 4/2003 | Smith | 706/46 |
| 6,564,378 B1 * | 5/2003 | Satterfield et al. | 725/40 |
| 6,574,798 B1 * | 6/2003 | Bradley et al. | 725/153 |

* cited by examiner

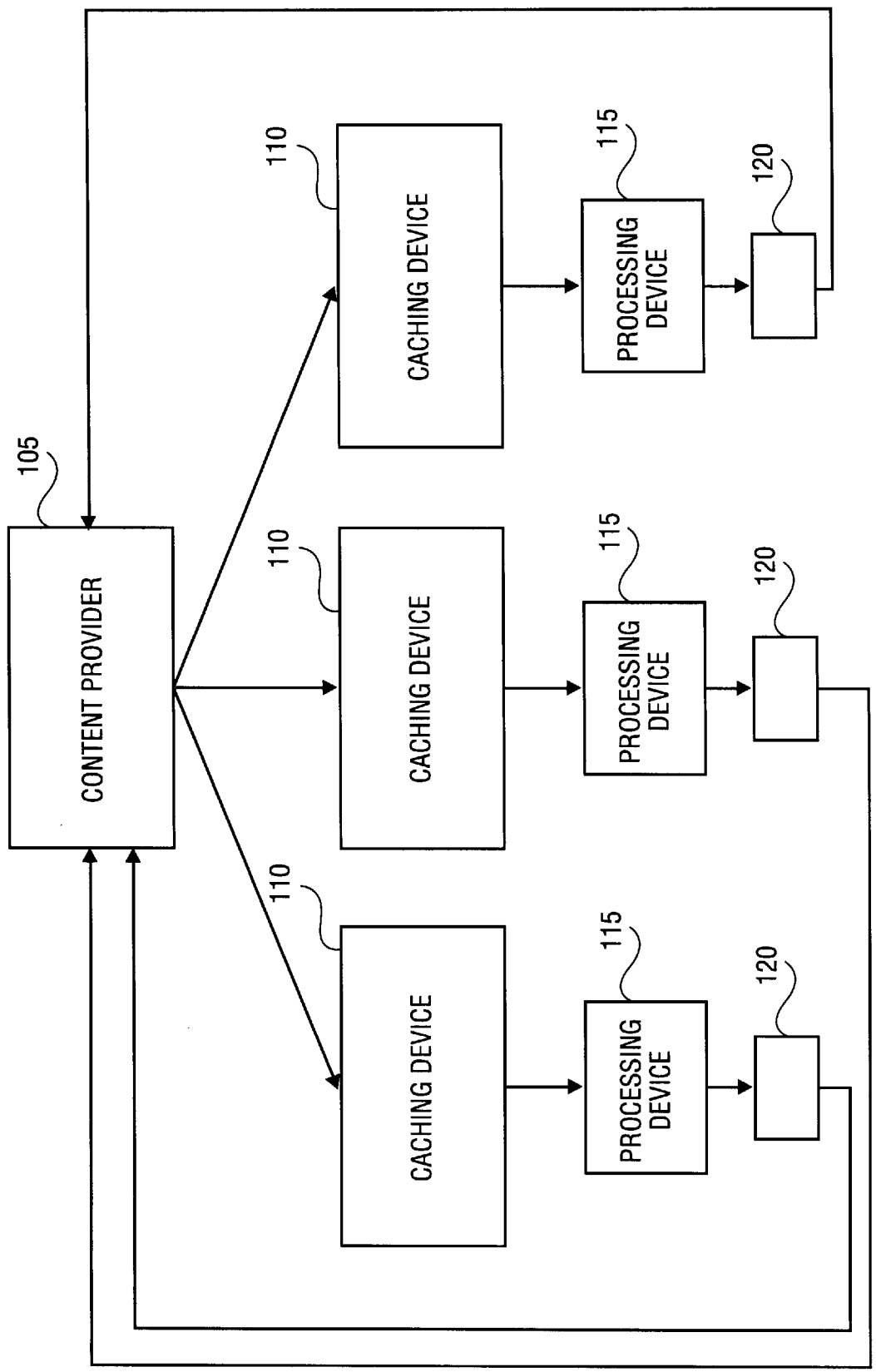

SECURE CACHED SUBSCRIPTION SERVICE

FIELD OF THE INVENTION

The invention relates in general to a system for the downloading of content over a network and in particular to a system for the downloading of information into a secure cached subscription system from a content provider.

BACKGROUND OF THE INVENTION

As networks and computers have been able to deliver information faster, users have begun to expect instantaneous information on demand. However, the high cost of providing network communications links to individual users has prevented true information on demand systems from being developed.

Within the context of Video-On-Demand (VOD), systems have been developed for distribution of video programming at the user's request. These systems have typically used Asymmetric Digital Subscriber Line (ADSL) telephone channels, together with public switched telephone networks, for the delivery of video program materials. ADSL channels are bidirectional digital telephone links having bandwidths of 1.54 megabyte in the download direction and 9600 bytes per second in the upload direction. (Download being from a content provider to the individual user). Real-time delivery of video data is necessary to prevent detectable jitter of the image and corruption of the data. For example, without real-time delivery, the voice of a speaker may not match the lip movement or the audio may be unintelligible.

Cable television (CATV) data networks have been developed that allow a continuous connection to the Internet through the cable company's broadband network. Typically, access to the Internet is provided through a cable modem (or set-top box) connected to the user's television. The Internet connection is provided on one or two channels of the existing cable network. However, to provide true video on demand through a cable network, the high bandwidth cable channel (for example, hybrid fibre-wax) from the provider to the home needs to be provided. Such a channel is restricted to the lowest bandwidth along any path within the network. Such conventional channels have been of low quality and high cost. There is a high capital expense associated with generating bandwidth to download information directly from the content provider to the processing device. This is because each channel is dedicated to a particular user from a video service to the destination set-top box. In addition, a large demand for the same program or information is difficult to service as capital equipment for generating each program channel is limited.

Direct broadcast satellite (DBS) systems also provides high speed connections to the Internet and video-on-demand. DBS systems provide real-time downloads of information on a pre-arranged schedule or on demand within existing channels. DBS signals allow several programs to be broadcast from a single satellite transposer. This allows a satellite disk to receive up to 200 channels from a single, set position. Thus, DBS systems are capable of providing specialized programming and multiple data channels to the user. However, both CATV data networks and DBS systems have associated higher costs in installation.

What is required is a system that takes advantage of the existing networks, with their associated latency, without increasing the cost of the networks to produce systems that provide information on demand.

SUMMARY OF THE INVENTION

A system and method for a secure cached subscription system is described. In one embodiment, the system comprises a content provider and a caching device connected to the content provider. The content provider speculatively downloads information into the caching device based upon a user's data. A processing device is connected via a high-bandwidth connection to the caching device for processing the information.

BRIEF DESCRIPTION OF THE DRAWINGS

The present invention is illustrated by way of example and not limitation in the figures of the accompanying drawings, in which like references indicate similar elements and in which:

FIG. 1a is a block diagram of an embodiment for a secure cached subscription system.

DETAILED DESCRIPTION

Figure 1B:
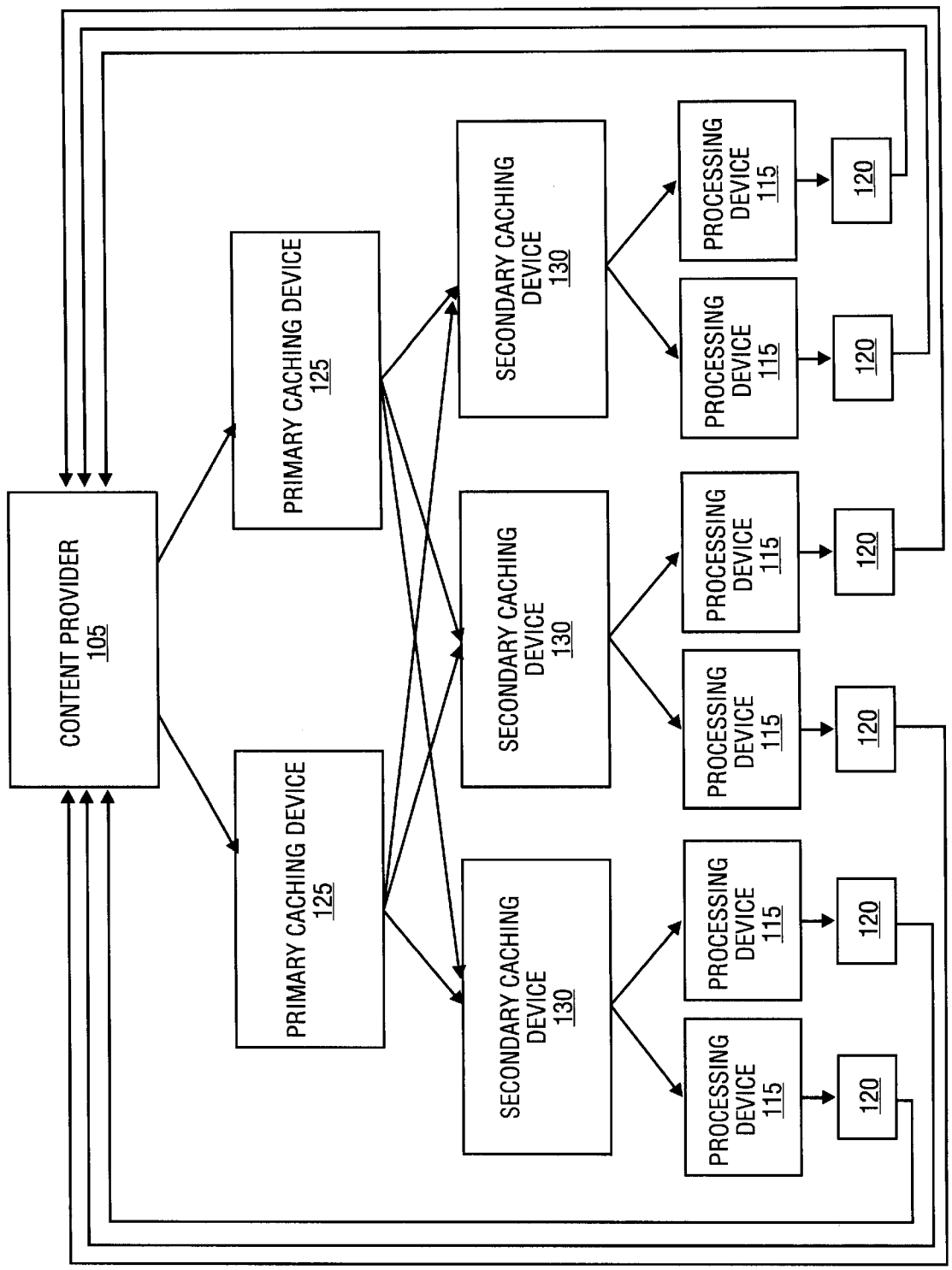
FIG. 1b is a block diagram of an alternate embodiment for a secure cached subscription system.

A system and method for a secure cached subscription system is described. Although the description that follows uses examples of caching video information, the embodiments are not limited to video information. The embodiments relate to the caching of any type of information within a secure cached subscription system. Although the embodiments describe here are discussed in terms of viewing data, it will be apparent to one skilled in the art that any type of data may be incorporated into the present invention. For example, the data may be video data, audio data, text data, or any other suitable type of data.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. The algorithms and displays presented herein are not inherently related to any particular computer or other apparatus. Various general-purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

FIG. 1a is a block diagram of one embodiment of a secure cached subscription system 100. Secure cached subscription system 100 includes content provider 105, a set of caching devices 110, attached to each caching device, processing devices 115 and connected to each caching device, authentification devices 120. Content provider 105 may be any service which supplies information for a fee for example, cable television companies, Internet content providers such as the Wall Street Journal Online and the @Home Network, our legal information services such as Lexis® and Westlaw®, and other similar services. Referring to FIG. 1a, content provider 105 is attached to caching devices 110 by conventional networking connections. Such connections may include Internet connection, telephone lines, or other similar connections. In one embodiment, caching device 110 may be connected via high speed network connections to processing device 115. Such high speed network connections may include J1394 (FireWire) connections, Ethernet connections, Asynchronous Transfer Mode (ATM) connections, or the like. Authentification devices 120 are connected to processing device 115 and to content provider 105 and provide access control to content provider 105 for the individual processing device 115. In alternate embodiments, authentification devices 120 may be incorporated within processing device 115 or within caching device 110.

In one embodiment, data concerning the television viewing habits of a user may be maintained within processing device 115. The information may be gathered by any well-known technique for gathering and storing the user data. For example, the data may indicate that the user views a particular television show on Thursday nights or may indicate that the user prefers to view action type movies. The viewing data is transferred to content provider 105. Content provider 105 uses the viewing data to return information (e.g., television shows or movies) to the caching device 110.

For example, if a user's viewing data indicates a preference for action movies, content provider may return five action movies from the content depot for download. In one embodiment, content provider 105 transfers the information (movies) to caching device 110 during off-peak hours. The information may be encrypted and/or compressed for download. The information (movies) remains in caching device 110 until the user requests to view the information. For example, of the five action movies stored within caching device 110, the user may request to view only one of the movies. In one embodiment, the caching device 110 transfers the chosen movie to processing device 115 for viewing by the user. In one embodiment, if a user requests a movie not in the cache while information is being downloaded into the cache, the system may stop downloading information into the cache and begin downloading the requested movie. In one embodiment, the movie may be downloaded into the cache. In an alternate embodiment, the requested movie may be directly downloaded into processing device 115. In an alternate embodiment, the signal information download may be marked for continuation of the download of the information after the newly requested movie is downloaded. In an alternate embodiment, if the original download is substantially finished or the requested movie will not be available for some time, the system may notify the user and continue the original download.

In one embodiment, caching device 110 then sends viewing data to content provider 105 indicating that a movie has been sent to processing device 115. In this embodiment, the user is charged for viewing the movie when it is sent to processing device 115 and not before. Thus, for example, the user would only be charged for the one movie viewed and not for the five movies speculatively transferred to caching device 110. In addition, the viewing data may be used to update the viewing data maintained within content provider 105.

Figure 2:
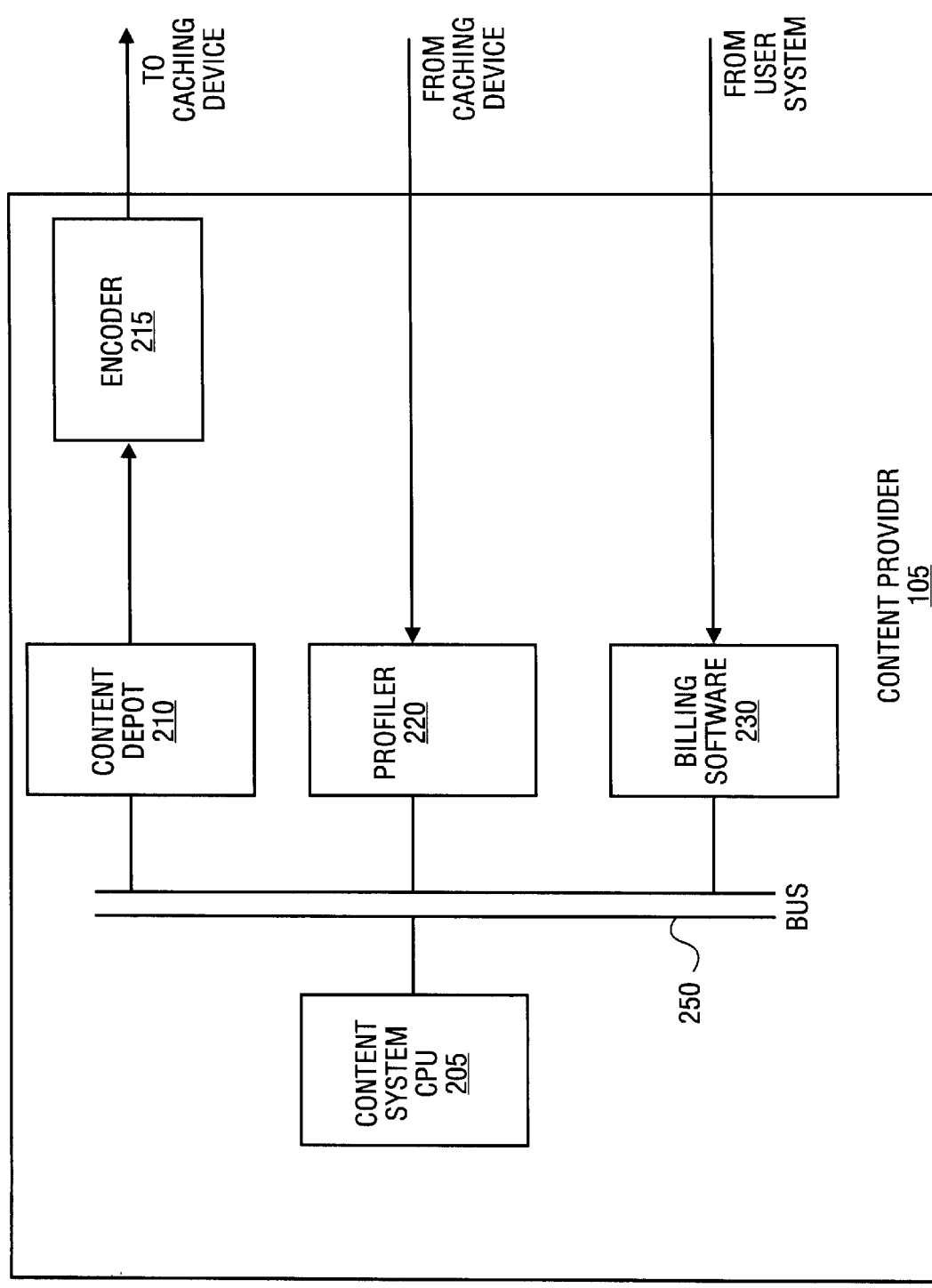
FIG. 2 is a block diagram of one embodiment for a content provider.

FIG. 2 is a block diagram of one embodiment for content provider 105. Content provider 105 includes content system CPU 205 for controlling the various components connected to content provider 105 and for executing software routines contained within content provider 105. Content provider 105 also includes content depot 210 connected via bus 250 to content system CPU 205. Content depot 210 contains the multimedia information that may be downloaded to a user system (i.e., video and/or audio content). The content depot 210 is connected to encoder 215 for encoding the information for transmission to the user. In one embodiment, the information to be downloaded may be encrypted or otherwise encoded before being sent to caching device 110. In addition, content provider 105 includes profiler 220, which contains viewing data concerning the users' viewing habits of secure cached subscription system 100. Viewing data contained within the profiler may include the users' viewing habits, credit card information, subscription information, and the like. In one embodiment, viewing data within profiler 220 is updated from caching device 110 during operation of secure cached subscription system 100. Alternatively, a user's viewing data within profiler 220 may be updated from the user's processing device.

Content provider 105 also includes billing software 230 for creating billing invoices regarding use of content provider 105 by a user. Billing information may be received from the user system and updated by billing software 230. Billing software 230 also interacts with profiler 220 for maintaining a user's personal profile within content provider 105. In one embodiment, viewing data includes the user's viewing habits and the user's information requests as well as the user's billing information.

Figure 3:
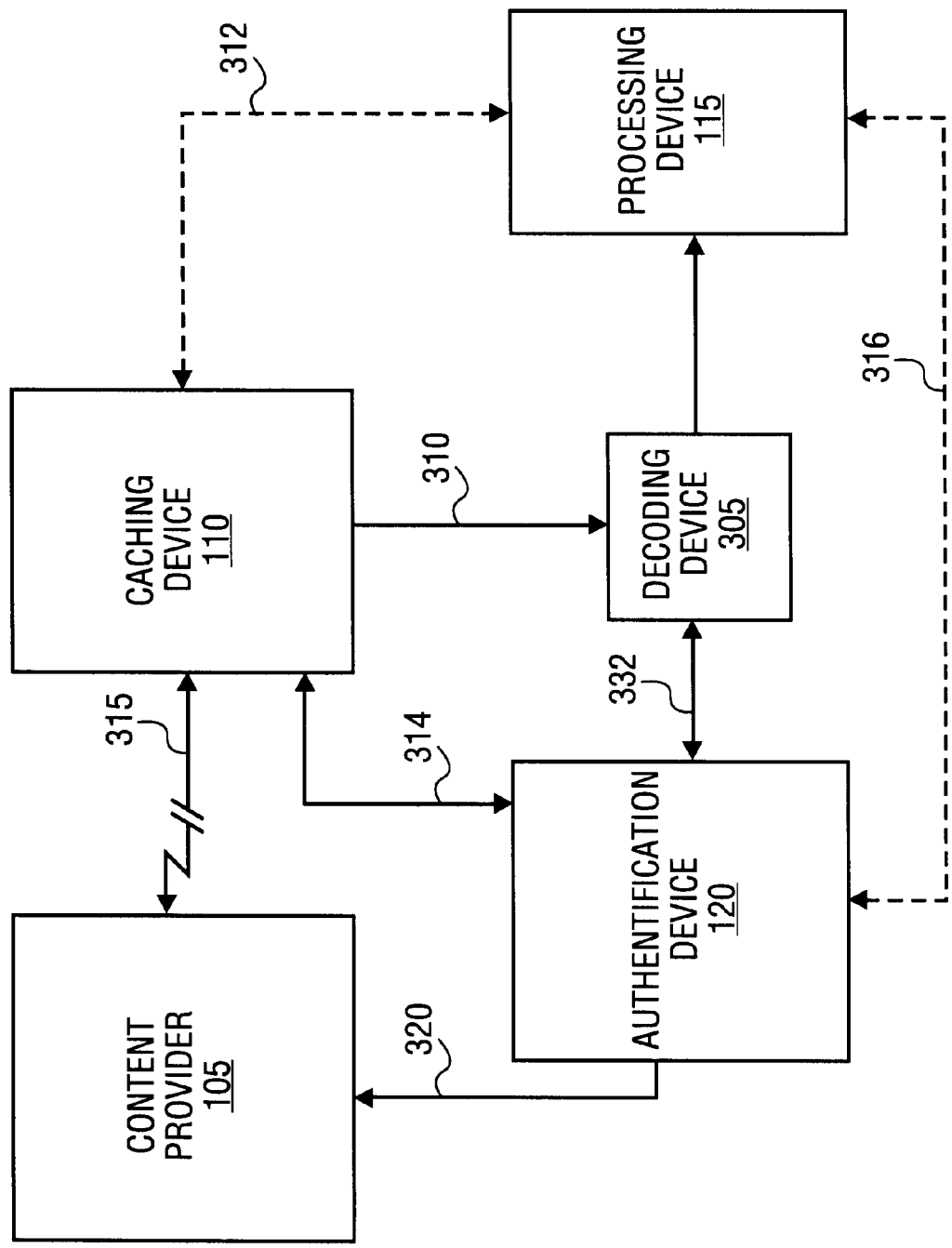
FIG. 3 is a block diagram of another embodiment for a secure cached subscription system.

FIG. 3 is a block diagram of another embodiment of secure cached subscription system 100. Referring to FIG. 3, content provider 105 is connected via network connection 315 to a single cache device 110. In one embodiment, caching device 110 may be connected via high bandwidth connection 310 to decoding device 305. In this embodiment, decoding device may be connected to processing device 115 and to authentification device 120. Decoding device 305 may be any of a variety of decoding devices such as, for example, a set-top box. In an alternate embodiment, caching device 110 may be connected via high speed network link 312 directly to processing device 115.

In one embodiment, caching device 110 is remotely connected to processing device 115. In this embodiment, information may be received from the remote caching device 110 by a separate server (not shown) or may be received directly by either decoding device 305 or processing device 115. Alternatively, caching device 110 may be connected to processing device 115 (or alternately, decoding device 305) within a local area network (LAN).

In one embodiment, authentification device 120 may be connected via connection 320 to content provider 105. Connection 320 may be a high-bandwidth connection such as, for example, a cable-television channel, DSL line, digital broadcast satellite connection, or the like, or a telephone line. In one embodiment, authentification device 120 is connected to caching device 110 and controls access to the content depot 210 within content provider 105. In alternate embodiments, authentification device 120 may be connected via connection 322 to decoding device 305 or via connection 316 to processing device 115. In alternate embodiments, authentification device 120 may be embed within caching device 110, decoding device 305, or processing device 115.

Figure 4:
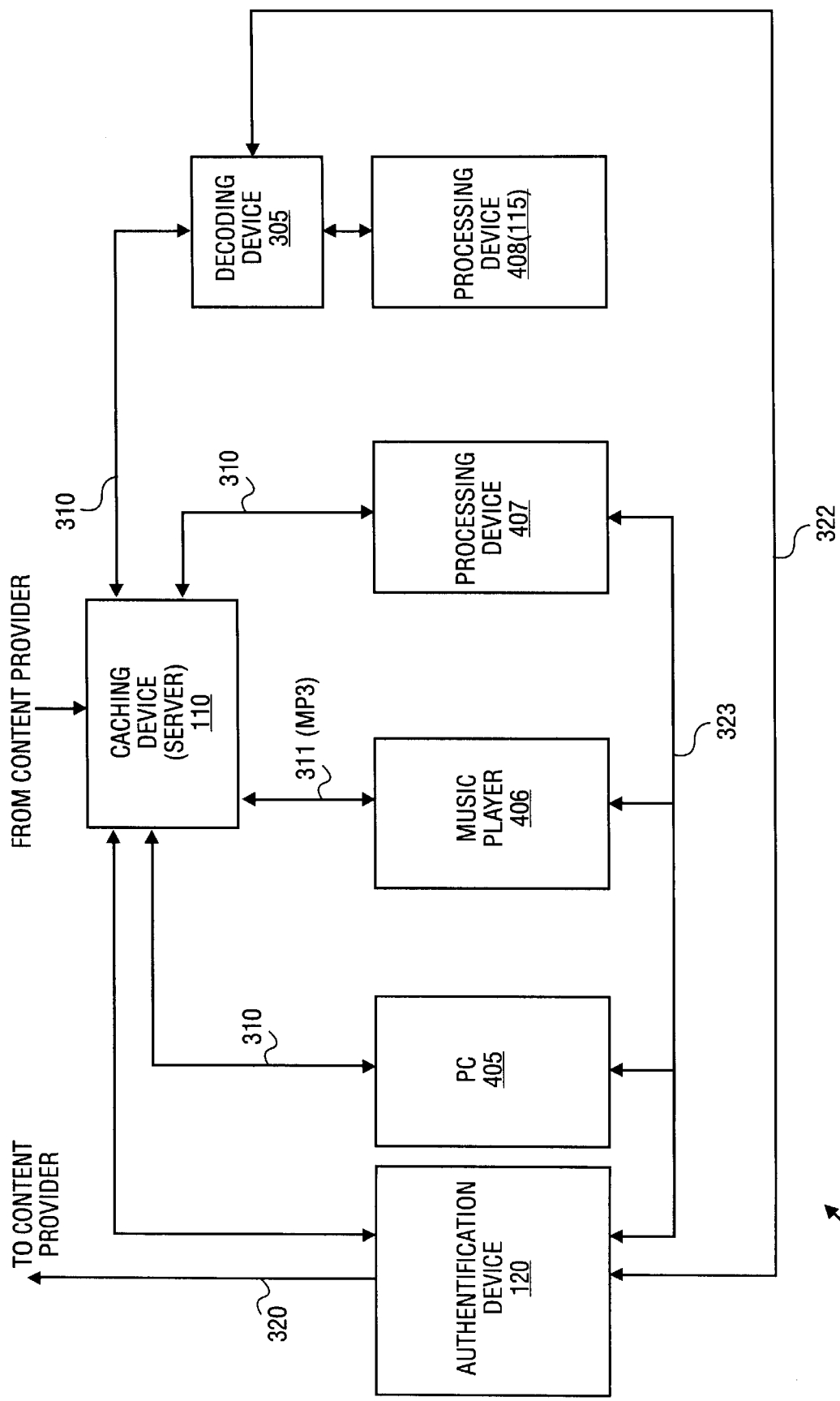
FIG. 4 is a block diagram for a user system of a secure cached subscription system.

FIG. 4 is a block diagram for a user system 400 of secure cached subscription system 100. User system 400 includes caching device 110. In one embodiment, caching device 110 may be a set-top box. Alternatively, caching device 110 may be a network server, a personal computer, or any suitable device. Caching device 110 may be connected to a set of devices 405–408. In one embodiment, the set of devices 405–408 may be connected via high bandwidth connections 310 and 311 to caching device 110. Referring to FIG. 4, a variety of processing devices 115 may be incorporated in user system 400. For example, user system 400 may include a variety of personal computers 405, music players 406, direct processing devices 407, and a processing device 408, such as a television, connected via decoding device 305 to caching device 110. Decoding device 305 may be a standard set-top box or any variety of decoding device. In one embodiment, music data, such as, for example, Motion Picture Experts Group (MPEG) audio layer 3 (MP3) files, is cached in caching device 110 for playback on music player 406. Music player 406 may be connected via high bandwidth connection 311 to caching device 110.

In one embodiment, user system 400 may be an existing LAN network connected via Ethernet or other high bandwidth connection 310. Alternatively, user system 400 may be a home server or personal computer connected to a variety of processing devices such as television sets, personal computers, or the like. In one embodiment, server operations may be performed separately from caching device 110 operations in separate devices. In one embodiment, caching device 110 is remotely connected to a user server. Caching device 110 may receive and store any type of information such as, for example, audio data, video data, text data, or the like.

Figure 5A:
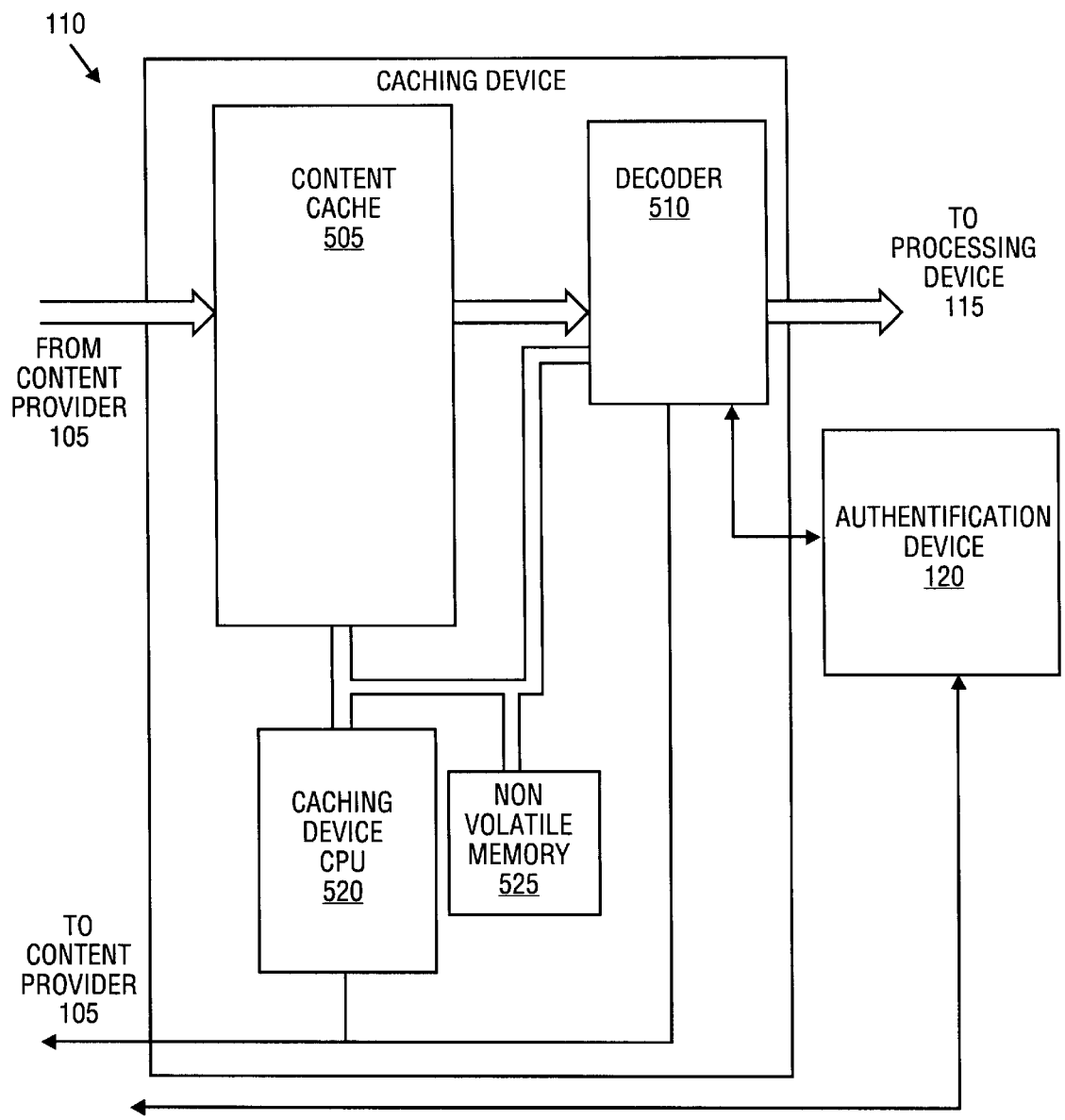
FIGS. 5A and 5B are block diagrams of embodiments for a caching device.
Figure 5B:
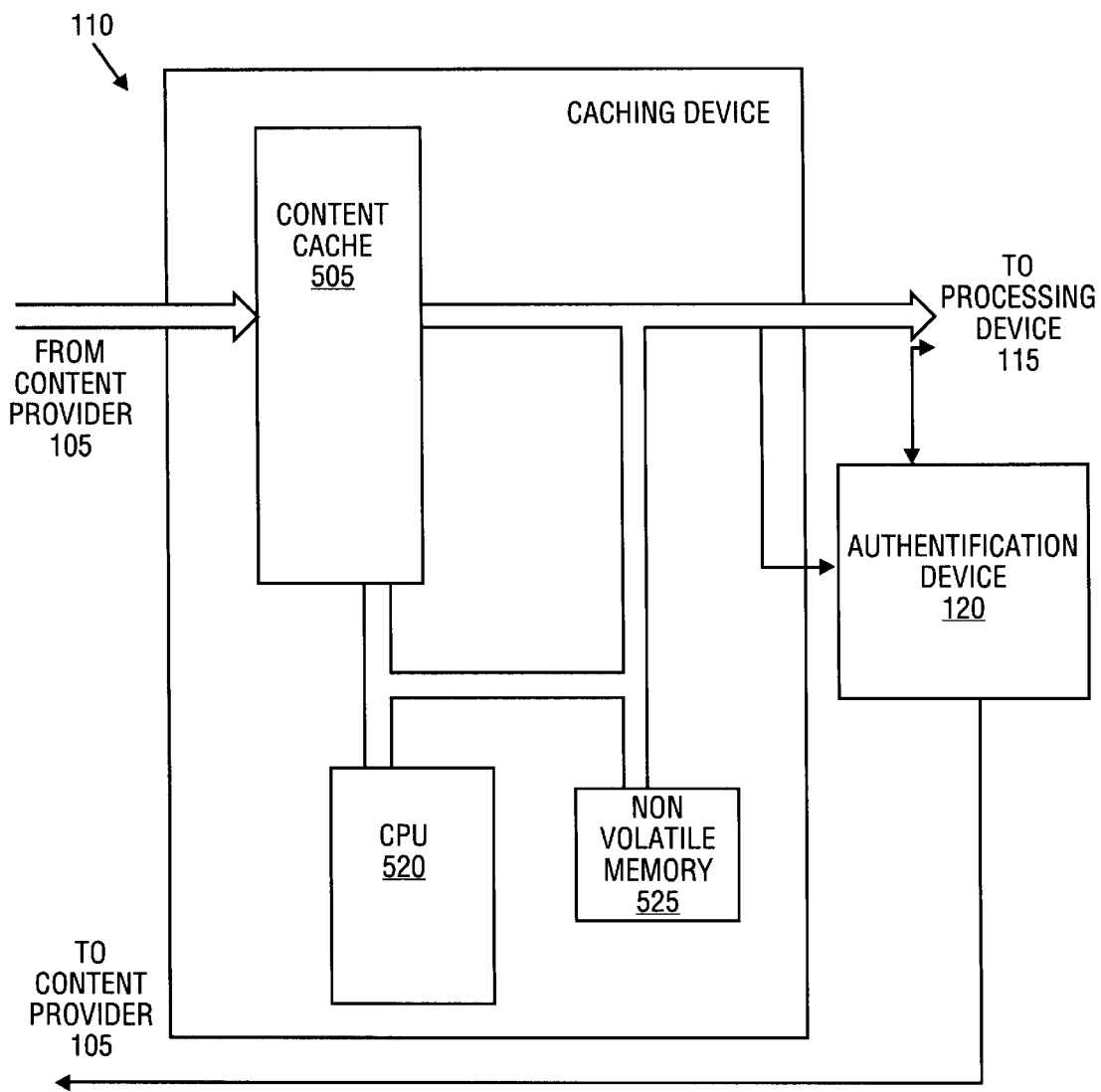

FIGS. 5A and 5B are block diagrams of embodiments for a caching device 110 of secure cached subscription system 100. Caching device 110 may physically reside within the content provider 105, at an independent head-in station, or within a user system 400 at a user's location. Referring to FIG. 5A, caching device 110 includes content cache 505, caching device CPU 520, decoder 510, and non-volatile memory 525. In one embodiment, information is received via network connection 315 from content provider 105. Network connection 315 may be any network connection such as an Internet connection or Asymmetric Digital Subscriber Line (ADSL) connection. As information is received, it is placed into content cache 505. In one embodiment, when the information is placed into content cache 505, the user is not charged for the content. Rather, the user is charged for the content at the time it is decoded. In one embodiment, caching device CPU 520 downloads the information from content cache 505 to decoder 510 at the user's direction. Decoder 510 then decodes the information and simultaneously sends viewing data to content provider 105 that the information is being decoded. In one embodiment, it is at this time that the user may be charged for the information. In this embodiment, the viewing data may be sent to billing software 230 within content provider 105. In addition, software routines maintained within nonvolatile memory 525 may update the user information contained within profiler 220. Decoder 510 subsequently sends the decoded information to processing device 115.

Caching device 110 may also be connected to authentification device 120. Authentification device 120 provides access control to content provider 105. In alternate embodiments, authentification device 120 may be incorporated within caching device 110. Authentification device 120 communicates with content provider 105 to authenticate the user of the system or the device as a valid device. In one embodiment, authentification device 120 provides a user identification and password to content provider 105. If authentification device 120 provides a valid user identification and password for a paid-up account, content provider 105 downloads the appropriate information to caching device 110. In alternate embodiments, authentification device 120 may maintain user and/or device identifications for a number of content providers 105.

Continuing the example from above, in this embodiment, the five action movies transferred from content provider 105 are first stored in content cache 505. When the user requests to view one of the movies, caching device CPU 500 transfers the movie from content cache 505 to decoder 510. Decoder 510 decodes the movie in order that it may be viewed by processing device 115 and transfers the movie to processing device. In one embodiment, when the movie is decoded, viewing data is sent to content provider 105 so that content provider 105 may charge the user for the actual viewing of the movie. Authentification of the user and/or device by authentification device 120 may be done prior to the download of data to caching device 110 or after download and prior to release of the data to processing device 115.

FIG. 5B is another embodiment of caching device 110. Referring to FIG. 5B, decoder 510 may be separate from caching device 110. Decoder operations in the FIG. 5B embodiment may be performed after the content cache information is extracted and transferred to processing device 115.

Figure 6:
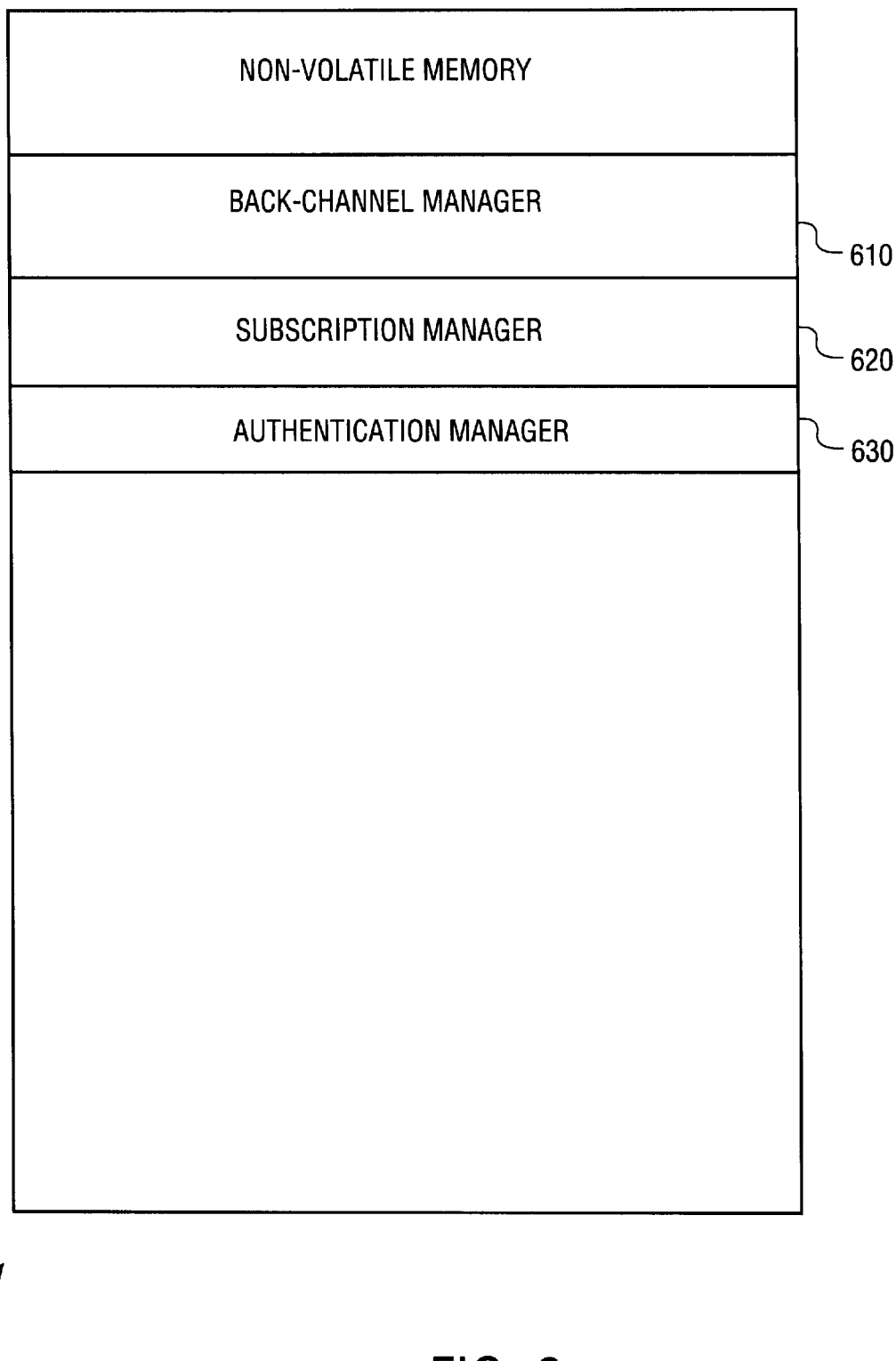
FIG. 6 is a block diagram of a non-volatile memory of FIGS. 5A and 5B.

FIG. 6 is a block diagram for one embodiment of non-volatile memory 525 of FIGS. 5A and 5B. In this embodiment, non-volatile memory 525 includes back-channel manager 610, subscription manager 620, and authentification manager 630. Back-channel manager 610 controls the decoding and downloading of information from content provider 105. Authentification manager 630 prevents a user from decoding information without verification of the user or device account with content provider 105. In an alternate embodiment, authentification manager 630 may reside within authentification device 120. Subscription manager 620 contains software routines for updating and maintaining the user viewing data contained in profiler 220. Subscription manager 620 contains software routines to record the viewing habits of a user during operation of secure cached subscription system 100. In alternate embodiments, the operations performed by back-channel manager 610 and subscription manager 620 may be maintained within processing device 115 or a separate decoder 305.

In one embodiment, back-channel manager 610 may prevent "hacking" or unauthorized downloading of the information from caching device 110. In one embodiment, information is encrypted by encoder 215. During subsequent decoding by decoding device 305, the information stored in content cache 505 may be decrypted. In this embodiment, decryption may not occur until the information is manipulated by processing device 115. As long as the information is maintained within content cache 505, the user is not billed for the use of the information and the information is not decrypted. In one embodiment, when the information is decrypted, the user may be charged for viewing the information based on the decoding of the information. For example, in the context of viewing news stories from an online newspaper or clipping service, the user may be charged by the page or may be charged by the story as they are decoded and viewed. In alternate embodiments, back-channel manager 610 may reside in processing device 115 or may reside in decoding device 305.

Authentification manager 630 verifies that the user and/or device requesting the download of information is authorized to do so. In one embodiment, authentification manager 630 sends a user/device identification and password to content provider 105. Authentification manager 630 may also send parameters to content manager 105 indicating the level of access for the user/device. For example, a user may not have access to adult rated or violent movies. In one embodiment, authentification manager 630 sends the user/device identification and parameters to content provider 105 before content provider 105 downloads the information to caching device 110. In an alternate embodiment, authentification manager 630 verifies access after content provider 105 downloads the data but prior to transfer of the data to processing device 115. In one embodiment, authentification manager 630 is maintained within caching device 110. In alternate embodiments, authentification manager 630 may be maintained within authentification device 120, decoding device 305, or processing device 115.

In one embodiment, a user may specify the type of information required from content provider 105. Subscription manager 620 maintains this request data and sends the request data to content provider 105. Content provider 105 may store the request data in profiler 220, together with the user's viewing data, for use by content provider 105 for the subsequent downloading of information from content depot 210. In one embodiment, during off peak hours, content provider 105 retrieves the information from content depot 210 based upon the viewing and request data contained in profiler 220 and encoder 215 subsequently encodes the information. The information is then downloaded to content cache 505. Alternatively, information may be immediately downloaded to caching device 110 using a separate channel within a multi-channel network contemporaneously with the request. For example, the information may be downloaded on a dedicated channel within a multi-channel network such as on a cable network. In this embodiment, while the user is viewing information on a first cable channel, the information may be downloaded to caching device 110 on a second cable channel.

Figure 7A:
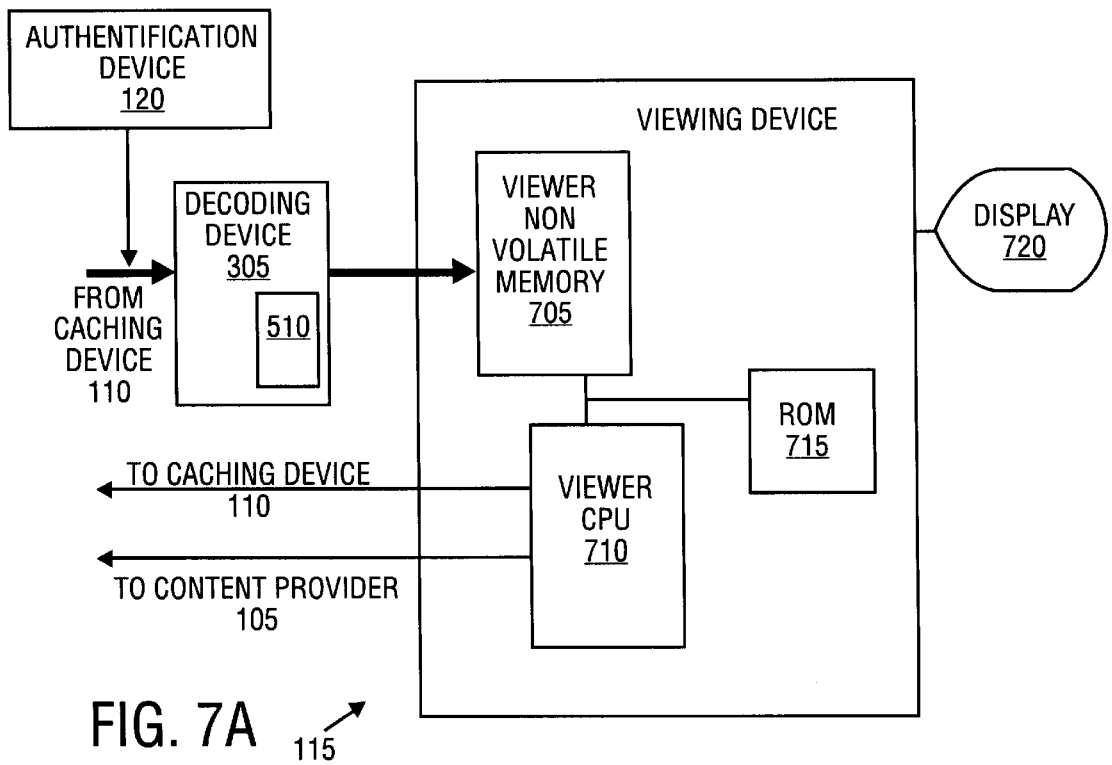
FIGS. 7A and 7B are block diagrams of embodiments for a processing device.
Figure 7B:
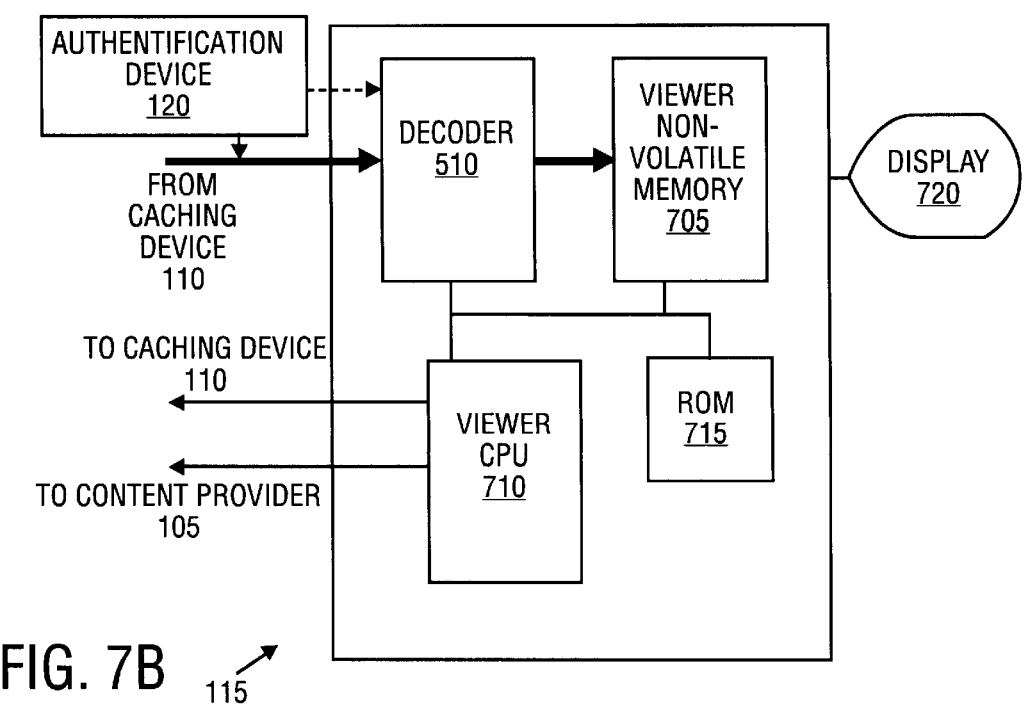

FIGS. 7A and 7B are block diagrams of embodiments for processing devices 115 of secure cached subscription system 100. In the FIG. 7A embodiment, information is received from caching device 110 by decoding device 305. Decoding device 305 may be a set-top box or any suitable decoding device. In this embodiment, decoder 510, maintained within decoding device 305, decodes the information received from caching device 110. In one embodiment, the information is stored in non-volatile memory 705 after decoding. The FIG. 7A processing device 115 may also contain a viewer CPU 710 and ROM 715. In one embodiment, information may be received into non-volatile memory 705 and viewer CPU 710 may use software routines maintained within ROM 715 to display the information on display 720. While the information is being decoded by decoding device 305, viewer CPU 710 may send viewing data to content provider 105.

FIG. 7B is another embodiment of processing device 115 in which processing device 115 includes decoder 510. The operation of the FIG. 7B processing device 115 is similar to that described for FIG. 7A. In an alternate embodiment (not shown), the decoder 510 may be maintained within caching device 110.

Figure 8:
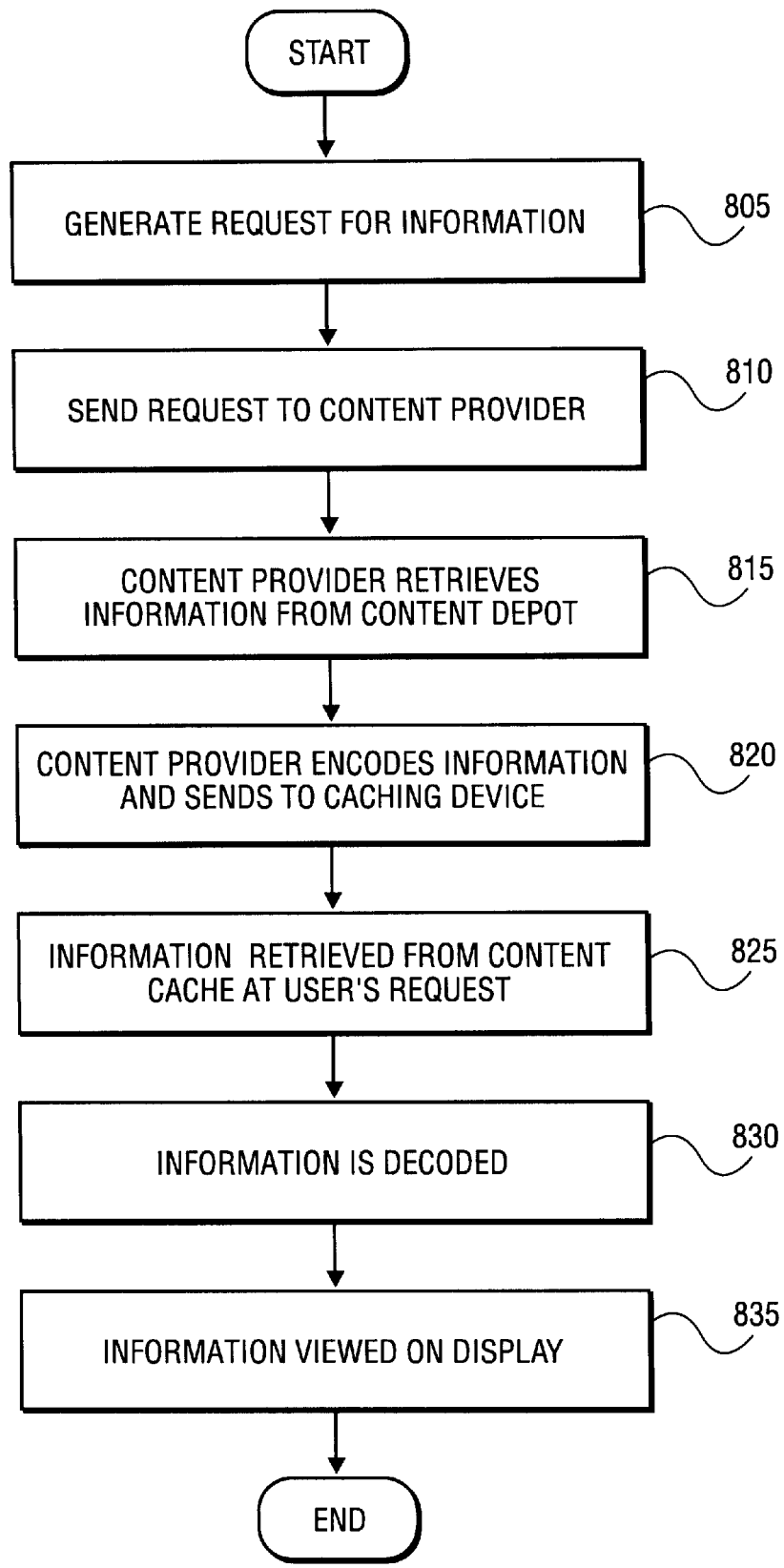
FIG. 8 is a flowchart of a method for one embodiment for downloading information from a content provider in a secure cached subscription system.

FIG. 8 is a flowchart of a method of one embodiment for downloading information from content provider 105 in secure cached subscription system 100. Initially a step 805, a request is generated for information from content provider 105. In one embodiment, authentification manager 630 verifies access to content provider 105 for the user and/or device. The request may be generated from within processing device 115, from within caching device 110, or may be initiated from profiler 220 within content provider 105. For example, in one embodiment, the viewing data of the user may reside within the processing device 115. Alternatively, the viewing data may reside in caching device 110. The data may be automatically generated by software within the processing device (viewing data), may be generated by the user by direct input (request data), or both. In one embodiment, the viewing and/or request data may be transferred to content provider 105 at a specific time (e.g., at 2 a.m.) or may occur at the user's initiation. In this embodiment, the request pulls the information from content provider 105 into caching device 110. In an alternate embodiment, the viewing data may reside within content provider 105. At a specific time, content provider 105 may retrieve the viewing data from profiler 220, extract the information from content depot 210 based upon the viewing data, and push the information to caching device 110. Alternatively, content provider 105 may pull the viewing data from either processing device 115 or caching device 110 before extracting the information.

Next, at step 810, the request is transferred to content provider 105. Then, at step 815, content provider 105 retrieves the information from content depot 210 based upon the request. In one embodiment, content provider 105 uses viewing data within profiler 220, together with the request data, to retrieve the information. Alternatively, if the request is generated from within content provider 105, only viewing data from profiler 220 may be used to retrieve the information. Then, at step 820, content provider 105 transfers the information to encoder 215 which encodes the information. Content provider 105 then transmits the encoded information to caching device 110. In one embodiment, caching device 110 stores the information in content cache 505. The transfer of the information from content provider 105 to caching device 110 may be done at off peak hours, or alternatively, using a low bandwidth connection contemporaneously with the request. Thus, the information may be placed in content cache 505 while a user is viewing a separate channel on a multi-channel network.

Next at step 825, the user requests to view the information and the information is retrieved from content cache 505. In one embodiment, the caching device 110, at step 830, decodes the information. Alternatively, the decoding may be performed in a separate decoder 510 or within processing device 115. In one embodiment, authentification manager 630 verifies access to the data for the user and/or device prior to the data being transferred out of caching device 110. In one embodiment, the transfer between caching device 110 and processing device 115 is over a high bandwidth connection 310. Such high bandwidth connection includes, but is not limited to, J1394 (FireWire) connection, Ethernet connection, or other fiber optic connections. Depending upon where the decoding is performed (whether in a caching device, a separate decoder, or a processing device), the data may be compressed for transmission from content provider 105. For example, sending video may be accomplished by using Motion Picture Experts Group (MPEG) compression. By using MPEG for video compression, information may be sent over low bandwidth connections without a noticeable decline in data transmission. In one embodiment, if information is compressed, it may be transmitted in its compressed form until it is decoded. Thus, if decoding does not occur until the information is within the processing device, the information may remain compressed until it reaches the processing device, and lower bandwidth connections may be used without a noticeable loss of quality. If compression is not used, higher bandwidth connections between the caching device and the processing device are required.

Next, at step 835, processing device 115 displays the information on display 720. Because the information may be stored within caching device 110, which is connected to processing device 115 by a high bandwidth connection, the downloaded information may be viewed interactively. For example, once a movie is extracted from content cache 505 and decoded, it may be stored anywhere within user system 400. Once the movie is stored, the user may "fast forward" through the movie, "pause" the movie, "rewind" the movie, or any other comparable action. In addition, extra information may be downloaded with the movie, such as related Internet web sites, biographies of the actors, and the like. Once the information is decoded, the user may switch between watching the movie reading the biographical information, and browsing the Internet site. Thus, the user may move through the content between the caching device 110 and the processing device 115. Thus, the embodiment described provides full interactive information on demand.

Several variations in the implementation for a secure cached subscription system have been described.

The specific arrangements and methods herein are merely illustrative of the principles of this invention. Numerous modifications in form and detail may be made by those skilled in the art without departing from the true spirit and scope of the invention.

Although this invention has been shown in relation to a particular embodiment, it should not be considered so limited. Rather, it is limited only by the appended claims.

What is claimed is:

1. A secure cached subscription system comprising:

At least one content provider having fee-based, on-demand information and also having billing software to bill a user account when the fee-based, on-demand information is requested by the user;

At least one primary caching device connected to the at least one content provider to receive the fee-based, on-demand information from the at least one content provider, wherein the at least one content provider is to speculatively download the fee-based, on-demand information into the caching device based upon viewing-habit data of the user;

At least one secondary caching device connected to the at least one primary caching device to receive the fee-based, on-demand information from the at least one primary caching device, wherein the at least one secondary caching device is to receive the fee-based, on-demand information from the at least one primary caching device based upon viewing-habit data of the user; and At least one processing device connected via a high-bandwidth connection to the at least one secondary caching device to process the fee-based, on-demand information, the content provider to charge the user account a fee after the processing device has processed the fee-based, on-demand information.

2. The system of claim 1 wherein the content provider is to also download the fee-based, on-demand information based on a user profile.

3. The system of claim 1 further comprising:

a decoding device to decode the fee-based, on-demand information before processing the fee-based on-demand information.

4. The system of claim 3 wherein the decoding device is a set-top box.

5. The system of claim 1 wherein the at least one caching device comprises:

a content cache to store the fee-based, on-demand information; and a decoder to decode the fee-based information in the content cache prior to processing by the processing device.

6. The system of claim 5 wherein the at least one secondary caching device is connected via a high-bandwidth connection to the processing device.

7. The system of claim 1 wherein the at least one caching device comprises:

a content cache to store the fee-based, on-demand information.

8. The system of claim 1 wherein the at least one caching device comprises:

a decoder to decode the fee-based, on demand information.

9. The system of claim 1 wherein the at least one processing device comprises:

a decoder to decode the fee-based, on-demand information before processing.

10. The system of claim 1 wherein the at least one caching device is remotely connected to the at least one content provider.

11. The system of claim 1 wherein the at least one caching device is to receive the fee-based, on-demand information from the at least one content provider during off-peak hours.

12. The system of claim 1 wherein the at least one caching device is to receive the fee-based, on-demand information from the at least one content provider on a separate channel.

13. The system of claim 1 wherein the at least one content provider comprises a profiler to maintain user preference information.

14. The system of claim 13 further comprising a subscription manager to update the profiler with user preference information.

15. The system of claim 1 further comprising an authentification manager configured to control access to the fee-based, on-demand information.

16. A secure cached subscription system comprising:

At least one content provider having fee-based, on-demand information and also having billing software to bill a user account when the fee-based, on-demand information is requested by the user, and having an encoder to encode the fee-based, on-demand information;

At least one primary caching device connected to the at least one content provider to receive the encoded, fee-based, on-demand information from the at least one content provider, wherein the at least one content provider is to speculatively download the encoded, fee-based, on-demand information into a content cache in the primary caching device based upon viewing-habit data of the user;

At least one secondary caching device connected to the at least one primary caching device to receive the encoded, fee-based, on-demand information from the at least one primary caching device, wherein the at least one secondary caching device is to receive the encoded, fee-based, on-demand information from the at least one primary caching device into a content cache in the secondary caching device based upon viewing-habit data of the user;

At least one decoding device connected to the at least one secondary caching device to decode the encoded, fee-based, on-demand information to produce unencoded, fee-based, on-demand information; and At least one processing device connected via a high-bandwidth connection to the at least one decoding device to process the unencoded, fee-based, on-demand information, the processing device connected to the content provider, and the content provider to charge the user account a fee after the processing device has processed the unencoded, fee-based, on-demand information.

17. The system of claim 16 further comprising:

a profiler connected to the at least one content provider to maintain user preference information;

a subscription manager to update the profiler with current user preference information; and an authentification manager configured to control access to the fee-based, on-demand information.

18. A method for providing a secure cached subscription system, comprising:

Speculatively downloading fee-based, on-demand information from a content provider into a primary caching device based upon viewing-habit data of a user, the content provider having billing software to bill a user account;

Speculatively downloading fee-based, on-demand information from a primary caching device into a secondary caching device based upon viewing-habit data of a user;

Transferring the fee-based, on-demand information from the caching device to a processing device, upon a request of the user, so that the user can view the fee-based, on-demand information; and Charging the user account a fee after the fee-based, on-demand information has been transferred to the processing device.

19. The method of claim 18 further comprising:

decoding the fee-based, on-demand information after speculatively downloading the fee-based, on-demand information into the caching device.

20. The method of claim 18 further comprising:

authenticating access to the fee-based, on-demand information.

21. The method of claim 18 further comprising speculatively downloading the fee-based, on-demand information from the content provider based upon user data.

22. The method of claim 18 further comprising speculatively downloading the fee-based, on-demand information from the content provider based upon a user profile.

23. The method of claim 18 wherein the caching device is remotely connected to the content provider.

24. The method of claim 18 wherein speculatively downloading fee-based, on-demand information from the content provider is done during off-peak hours.

25. The method of claim 18 wherein speculatively downloading fee-based, on-demand information from the content provider is done on a separate channel.

26. The method of claim 18 further comprising decoding the fee-based, on-demand information before processing the fee-based, on-demand information.

27. The method of claim 26 further comprising:

accumulating billing information during decoding of the fee-based, on demand information; and transferring the billing information to the content provider.

28. A system for providing a secure cached subscription system, comprising:

Means for speculatively downloading fee-based, on-demand information from the at least one content provider into an at least one primary caching device, and then into an at least one secondary caching device, based upon viewing-habit data of a user, the content provider having billing software to bill a user account;

Means for transferring the fee-based, on-demand information from the secondary caching device to a processing device, upon a request of the user, so that the user can view the fee-based, on-demand information; and Means for charging the user account a fee after the fee-based, on-demand information has been transferred to the processing device.

29. An article of manufacture having one or more computer-readable media with executable instructions therein, which when executed by a processing device, causes the processing device to:

Speculatively download fee-based, on-demand information from a content provider into an at least one primary caching device, and then into an at least one secondary caching device, based upon viewing-habit data of a user, the content provider having billing software to bill a user account;

Transfer the fee-based, on-demand information from the caching device to a processing device, upon a request of the user, so that the user can view the fee-based, on-demand information; and Charge the user account a fee after the fee-based, on demand information has been transferred to the processing device.

* * * * *